(12) United States Patent
Myers et al.

(10) Patent No.: US 8,844,396 B2
(45) Date of Patent: Sep. 30, 2014

(54) AXLE ASSEMBLY

(75) Inventors: Gary Myers, Battle Creek, MI (US);
Joseph A. Rozman, Royal Oak, MI (US); Charles R. Pajtas, Sterling Heights, MI (US); Shawn E. Bronner, Detroit, MI (US); Syed M. Akbari, Peoria, IL (US)

(73) Assignee: Chrysler Group LLC, Auburn Hills, MI (US)

( * ) Notice: Subject to any disclaimer, the term of this patent is extended or adjusted under 35 U.S.C. 154(b) by 288 days.

(21) Appl. No.: 12/984,146

(22) Filed: Jan. 4, 2011

(65) Prior Publication Data

US 2012/0172167 A1 Jul. 5, 2012

(51) Int. Cl.
*F16H 57/04* (2010.01)
*F16H 48/08* (2006.01)
*F16H 48/42* (2012.01)

(52) U.S. Cl.
CPC ...... *F16H 57/0483* (2013.01); *F16H 2048/423* (2013.01); *F16H 57/0457* (2013.01); *F16H 57/0471* (2013.01); *F16H 57/0424* (2013.01)
USPC ............ 74/424; 184/11.2; 384/473; 384/474; 384/311; 384/316; 475/160

(58) Field of Classification Search
CPC ............ F16H 57/0424; F16H 57/0457; F16H 57/0471; F16H 57/0483; F16H 2048/423
USPC ............ 74/424, 467, 607, 606 R, 606 A, 423, 74/416; 475/160, 159; 184/11.1, 11.2, 70, 184/96, 97, 106, 13.1, 6.12, 8, 109; 384/473, 474, 462, 93, 311, 316
See application file for complete search history.

(56) References Cited

U.S. PATENT DOCUMENTS

| | | | | |
|---|---|---|---|---|
| 1,631,217 A | * | 6/1927 | Matthews | 184/13.1 |
| 1,760,356 A | * | 5/1930 | Harper | 184/13.1 |
| RE18,708 E | * | 1/1933 | Harper | 184/13.1 |
| 1,968,618 A | * | 7/1934 | Padgett et al. | 74/424 |
| 2,015,108 A | * | 9/1935 | Harper | 184/11.1 |
| 2,018,188 A | * | 10/1935 | Padgett et al. | 184/11.1 |
| 2,147,145 A | * | 2/1939 | Carlson et al. | 184/11.2 |
| 2,240,118 A | * | 4/1941 | Matthews | 184/11.1 |
| 2,242,195 A | * | 5/1941 | Teker et al. | 184/11.1 |
| 2,368,963 A | * | 2/1945 | Boden | 184/11.1 |
| 2,529,623 A | * | 11/1950 | Murray | 475/203 |
| 2,802,548 A | * | 8/1957 | Mart et al. | 184/6.12 |
| 2,908,351 A | * | 10/1959 | Daley, Jr. | 184/6.12 |
| 3,383,937 A | * | 5/1968 | Toenne et al. | 74/467 |
| 3,441,106 A | * | 4/1969 | Benjamin et al. | 184/6.12 |
| 3,545,568 A | * | 12/1970 | Lacoste | 184/6.12 |
| 3,618,711 A | * | 11/1971 | Vollmer | 184/6.12 |

(Continued)

*Primary Examiner* — Troy Chambers
*Assistant Examiner* — Valentin Craciun
(74) *Attorney, Agent, or Firm* — Ralph E. Smith

(57) ABSTRACT

An axle assembly for a vehicle including a first gear, and a second gear joined to a shaft extending along a longitudinal axis. The second gear engages the first gear. A bearing is disposed over the shaft distal the second gear. A housing is disposed about at least a portion of the shaft. The housing includes a first lubricant pathway spaced apart from a second lubricant pathway, wherein the first lubricant pathway routes lubricant towards the bearing and the second lubricant pathway routes lubricant away from the bearing. The first and second lubricant pathways are not in a position coplanar with a plane of rotation of the first gear.

19 Claims, 4 Drawing Sheets

(56) References Cited

U.S. PATENT DOCUMENTS

| | | | |
|---|---|---|---|
| 3,785,458 A * | 1/1974 | Caldwell et al. | 184/6.12 |
| 3,838,751 A * | 10/1974 | Brown | 184/6.12 |
| 3,931,783 A * | 1/1976 | Croisant | 440/75 |
| 4,018,097 A * | 4/1977 | Ross | 74/467 |
| 4,227,427 A * | 10/1980 | Dick | 74/467 |
| 4,271,717 A * | 6/1981 | Millward et al. | 74/467 |
| 4,656,885 A * | 4/1987 | Hori et al. | 74/467 |
| 4,677,871 A * | 7/1987 | Taniyama et al. | 74/467 |
| 4,841,797 A * | 6/1989 | Cerrington et al. | 74/467 |
| 5,232,291 A | 8/1993 | Kuan | |
| 5,404,963 A * | 4/1995 | Crepas et al. | 184/6.12 |
| 5,505,112 A * | 4/1996 | Gee | 74/606 R |
| 5,643,127 A * | 7/1997 | Yoshii et al. | 475/160 |
| 6,896,108 B2 * | 5/2005 | Schneider et al. | 188/264 R |
| 7,326,142 B2 * | 2/2008 | Asahi et al. | 475/160 |
| 2001/0005703 A1 * | 6/2001 | Iwata | 475/159 |
| 2005/0215389 A1 * | 9/2005 | Shimizu et al. | 475/331 |
| 2007/0068735 A1 * | 3/2007 | Mori et al. | 184/6.12 |
| 2008/0096715 A1 * | 4/2008 | Ono | 475/160 |
| 2010/0144480 A1 * | 6/2010 | Downs et al. | 475/160 |
| 2010/0304914 A1 * | 12/2010 | Barrett et al. | 475/160 |
| 2011/0111911 A1 * | 5/2011 | Hilker et al. | 475/160 |
| 2011/0212805 A1 * | 9/2011 | Hilker et al. | 475/160 |
| 2012/0031727 A1 * | 2/2012 | Nett et al. | 192/113.1 |
| 2012/0073403 A1 * | 3/2012 | Perakes et al. | 74/607 |

\* cited by examiner

AXLE ASSEMBLY

FIELD

The present disclosure relates to an axle assembly that includes a lubrication system where flow of a lubricant is aided by rotation of a pinion.

BACKGROUND

Axles may include a pinion that rotatably engages a ring gear. Bearings are utilized to support the pinion. Lubrication of the bearings improves the operation of the pinion and the axle. In general, lubricant has been provided to the bearings by rotation of the ring gear. In many applications, the plane of rotation of the ring gear is substantially orthogonal to the plane of rotation of the pinion. In many applications the pinion can be used to aid in lubrication of the bearings that support the pinion.

SUMMARY

The present disclosure provides an axle assembly for a vehicle including a first gear and a second gear joined to a shaft extending along a longitudinal axis. The second gear engages the first gear. A bearing is disposed over the shaft distal the second gear. A housing is disposed about at least a portion of the shaft. The housing includes a first lubricant pathway spaced apart from a second lubricant pathway, wherein the first lubricant pathway routes lubricant toward the bearing and the second lubricant pathway routes lubricant away from the bearing. The first and second lubricant pathways are not in a position coplanar with a plane of rotation of the first gear.

In one aspect, the first and second lubricant pathways are spaced approximately 180 degrees apart.

In another aspect, the second lubricant pathway is configured and positioned so a portion of the lubricant is retained at a bottom portion of the bearing after the second gear has stopped rotating.

In another aspect, at least one of the first and second lubricant pathways is disposed above the longitudinal axis.

In another aspect, at least one of the first and second lubricant pathways is angled relative to the longitudinal axis.

In another aspect, the second gear includes a plurality of splines and the lubricant enters the first lubricant pathway after being displaced by the splines.

In another aspect, the first lubricant pathway is configured to direct a predetermined quantity of the lubricant to the bearing.

In another aspect, at least a portion of the first or second lubricant pathways are positioned on an exterior of the housing.

Further areas of applicability of the present disclosure will become apparent from the detailed description and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Exemplary embodiments of an axle assembly are described below. The axle assembly includes a first gear that rotatably engages a second gear. The axle assembly further includes a first lubricant pathway and a second lubricant pathway. A bearing that supports the second gear is provided with lubricant. The first lubricant pathway routes the lubricant toward the bearing. The second lubricant pathway routes the lubricant away from the bearing. The lubricant flow toward the bearing may come from a sump or other source, may be displaced by the first gear before being directed toward the bearing, may be displaced by the second gear before being directed toward the bearing, and combinations thereof. The first and second lubricant pathways can be configured to optimize lubrication conditions of the bearing during operation of the axle and to ensure an optimal amount of lubricant is available for start-up conditions in various environments and vehicle demands.

Figure 1:
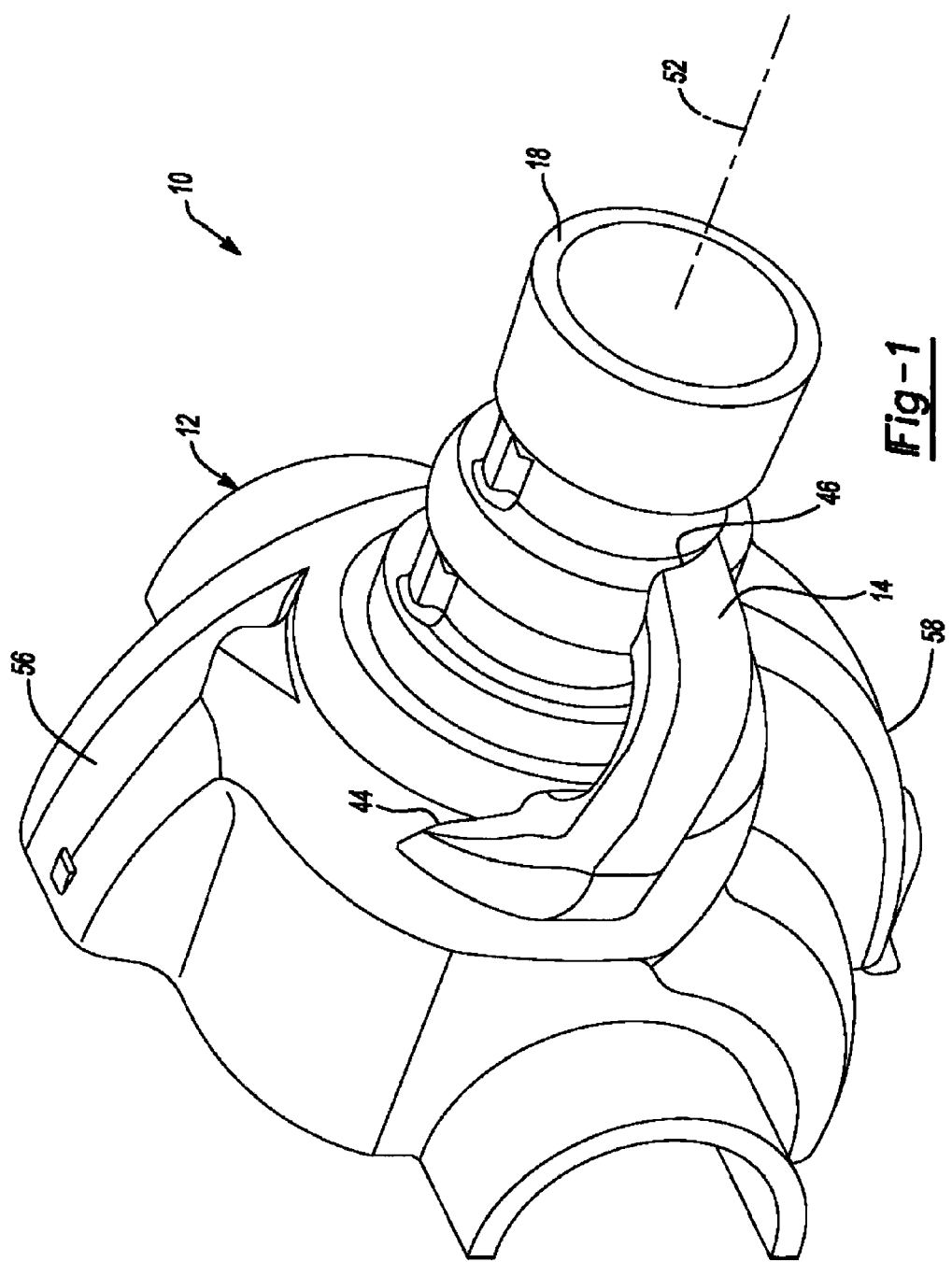
FIG. 1 is a partial perspective view of an axle assembly including a first lubricant pathway formed in an axle housing according to a principle of the present disclosure.
Figure 2:
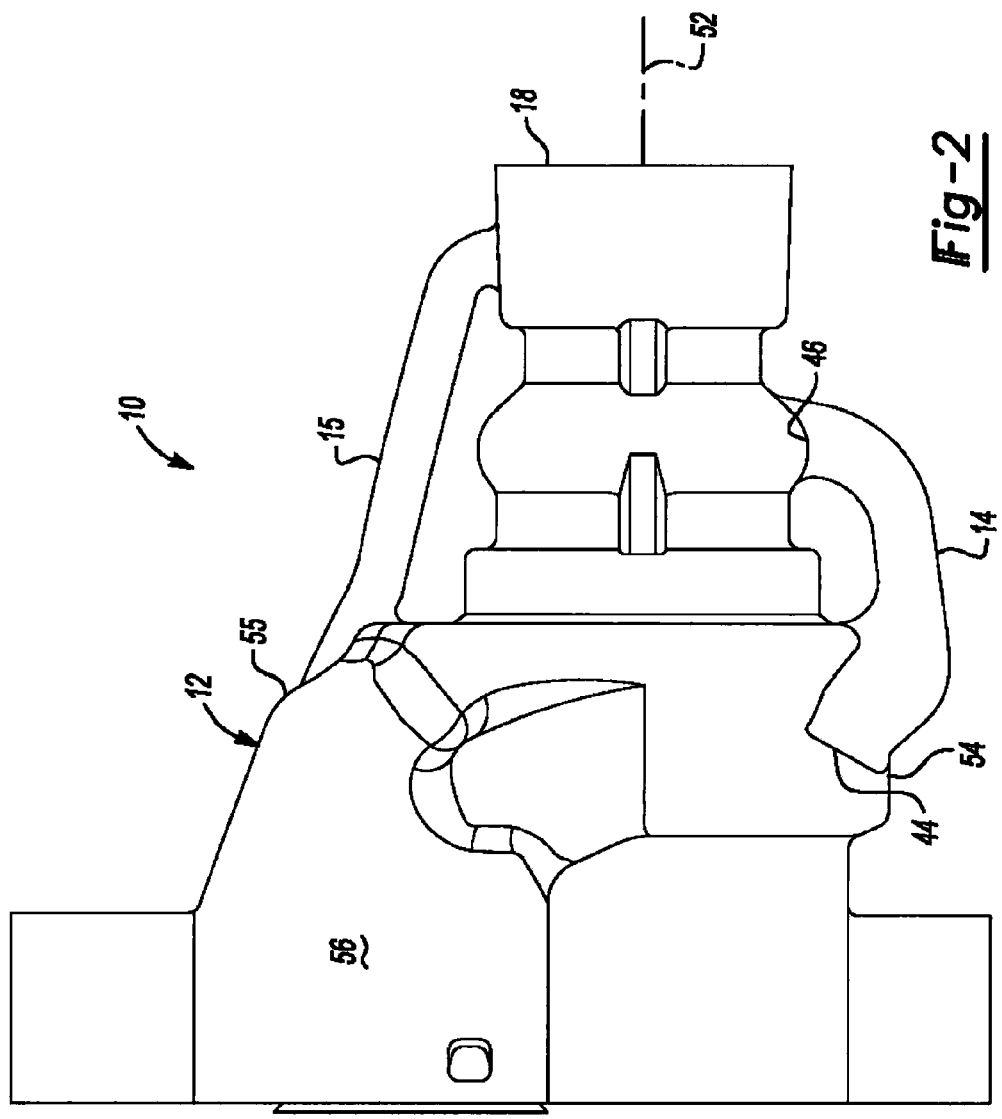
FIG. 2 is another partial perspective view of the axle assembly illustrated in FIG. 1, including the first lubricant pathway and a second lubricant pathway formed in the axle housing according to a principle of the present disclosure.
Figure 3:
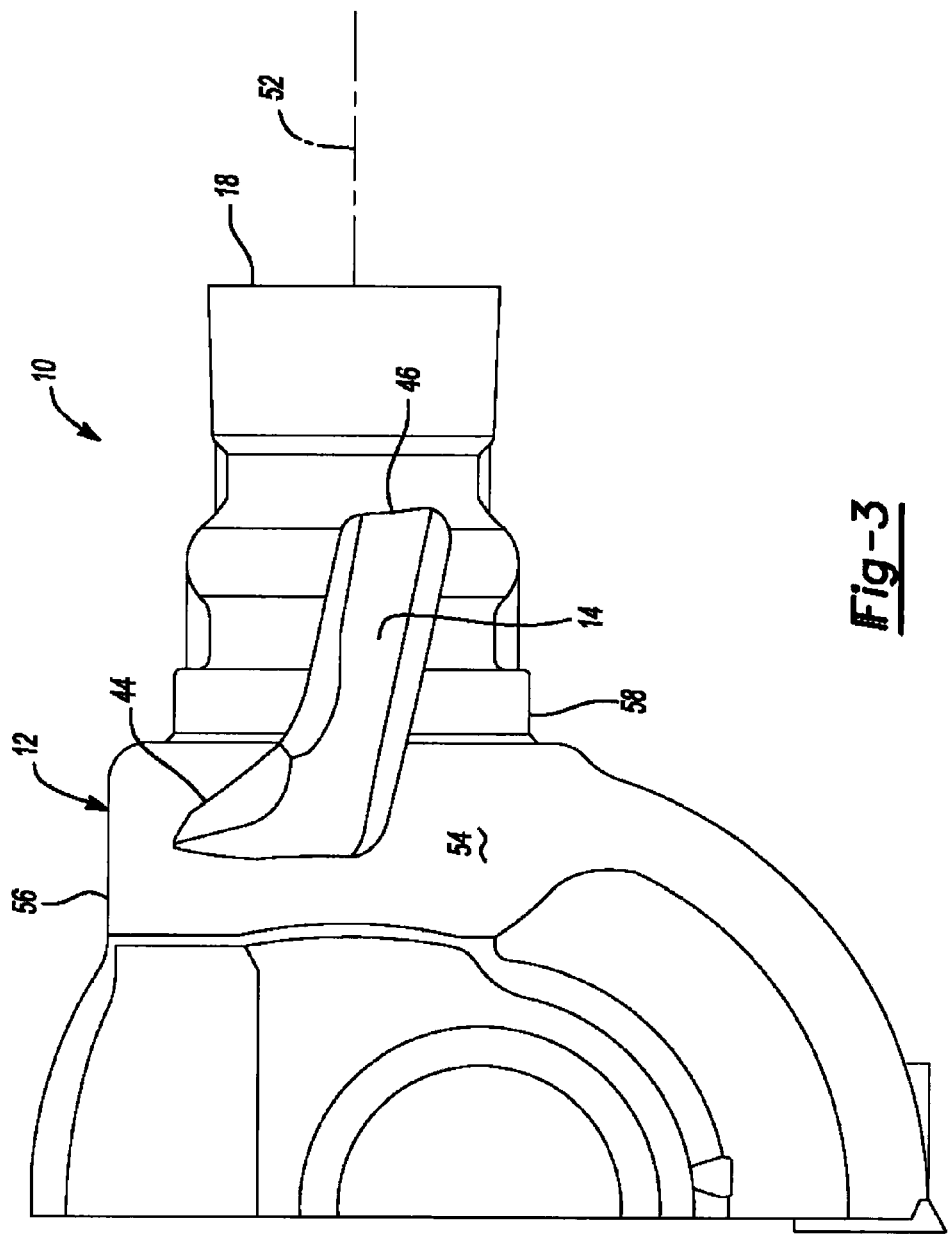
FIG. 3 is a partial side-perspective view of the axle housing including the first lubricant pathway according to the present disclosure.

FIGS. 1-3 illustrate an exemplary embodiment of an axle assembly 10 according to the present disclosure. Referring to FIGS. 1-3, the axle assembly 10 includes a housing 12 having a first lubricant pathway 14 and a second lubricant pathway 15 unitary with an exterior thereof. In an exemplary embodiment, the first lubricant pathway 14 and/or the second lubricant pathway 15 are at least partially contiguous with an exterior portion of the housing 12. First and second lubricant pathways 14 and 15 may be cast along with housing 12, or may be separately formed and subsequently joined to housing 12, without departing from the spirit and scope of the present disclosure. Housing 12 and first and second lubricant pathways 14 and 15 may be formed from steel, aluminum, or any other material with sufficient strength and rigidity known to one skilled in the art for forming an axle assembly.

Figure 4:
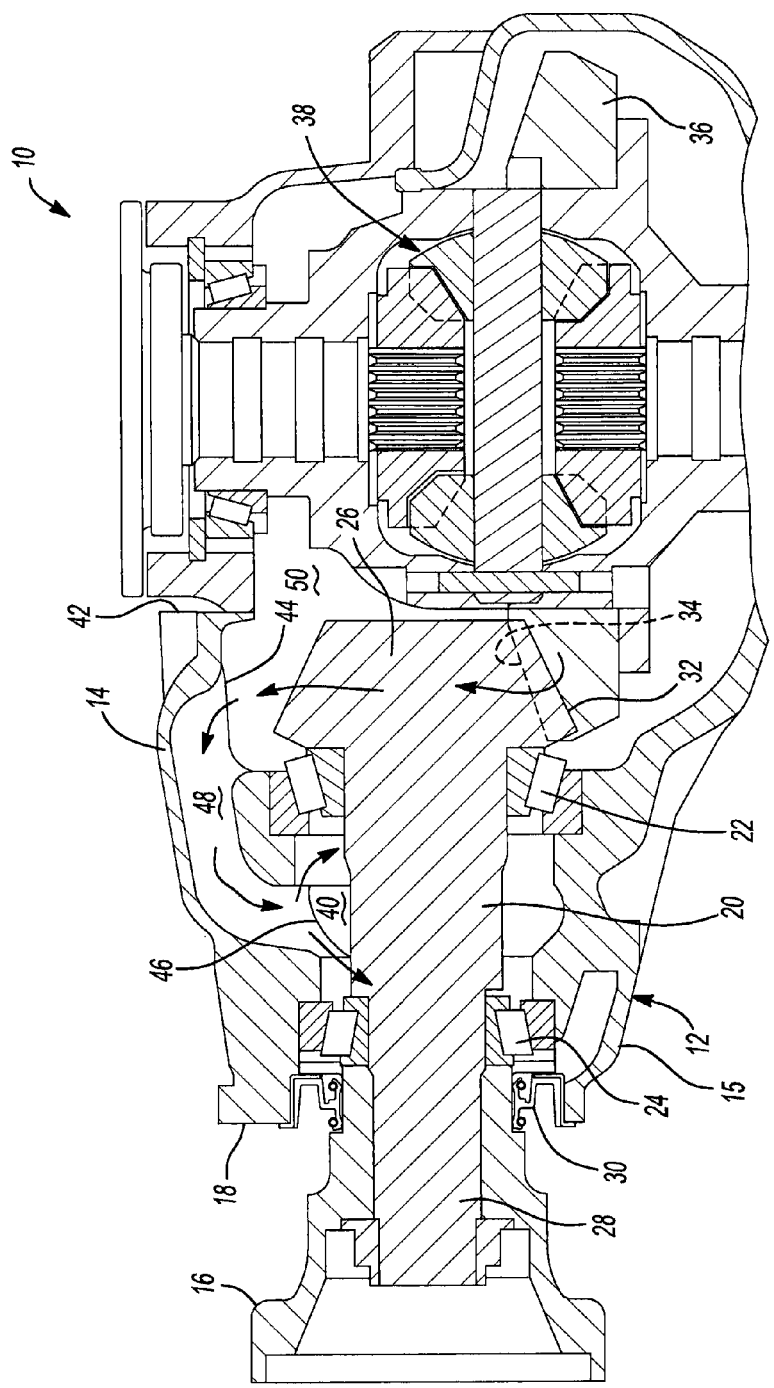
FIG. 4 is a cross-sectional view of the axle assembly illustrating flow of a lubricant through the lubricant pathway aided by rotation of a pinion according to a principle of the present disclosure.

Referring to FIG. 4, axle assembly 10 may include a coupling 16 joined to housing 12 at a first end 18 of housing 12. Coupling 16 joins a drive shaft (not shown) to the first end 18 of housing 12. More particularly, coupling 16 operably joins drive shaft (not shown) to a pinion shaft 20 rotatably supported within housing 12. Pinion shaft 20 is rotatably supported within housing 12 by a pair of bearings 22 and 24. Bearing 22 is a head bearing located proximate a head 26 of pinion shaft 20, while bearing 24 is a tail bearing located proximate a tail 28 of pinion shaft 20. Between coupling 16 and housing 12 may be disposed a seal assembly 30 that prevents leakage of a lubricant from housing 12.

Pinion shaft 20 includes a pinion 32 having plurality of splines meshingly engaged with a plurality of splines 34 of a ring gear 36. Ring gear 36 is oriented orthogonal relative to pinion 32 such that the rotation of the ring gear 36 occurs in a plane substantially orthogonal to the rotation of the pinion 32. Housing 12 further includes a differential gear assembly 38, which controls an amount of power transferred to a pair of wheels (not shown) connected to axle assembly 10, as is known in the art. The axle assembly 10 illustrated can be for a front-wheel drive vehicle, but the present disclosure should not be limited thereto. That is, the present disclosure is equally applicable to a rear-wheel, all-wheel, or four-wheel drive vehicle, without departing from the spirit and scope of the present disclosure.

Head and tail bearings 22 and 24 are provided with lubrication during operation of axle assembly 10. According to the present disclosure, rotation of pinion 32 aids in directing a lubricant through first lubricant pathway 14 (see arrows in FIG. 3). More particularly, rotation of pinion 32 aids in directing the lubricant in a direction from a second end 42 of axle housing 10 to first end 18. First lubricant pathway 14 acts as a lubricant feed for head and tail bearings 22 and 24, while second lubricant pathway 15 acts as a lubricant return for lubricant that has lubricated bearings 22 and 24, returns, for example, to a primary sump 50. In some configurations the lubricant enters the first lubricant pathway after being first displaced by the ring gear 36 and or the pinion 32. For example, lubricant can be displaced by the ring gear toward the pinion, where lubricant is then displaced by the splines of the pinion toward the first lubricant pathway. Lubricant can also be directed toward the first lubricant pathway after being displaced within a sump 40 (shown in FIG. 4) by the splines of the pinion. In some alternative configurations, lubricant can enter the first lubricant pathway directed from another source, for example, from a source external to the housing. In this exemplary embodiment the first and second lubricant pathways 14 and 15 are spaced apart from one another and are not in the same plane as the ring gear 36 plane of rotation. Although first and second pathways 14 and 15 are not in the same plane as ring gear 36 plane of rotation, one of first and second pathways 14 and 15 may include portions thereof that cross the ring gear 36 plane of rotation, or include portions thereof that are substantially coplanar with the ring gear 36 plane of rotation.

In an exemplary embodiment, second lubricant pathway 15 is configured and positioned such that a predetermined portion of lubricant is retained in sump 40 about a portion of one or both bearings 22, 24 when pinion 32 and ring gear 36 are in a stopped condition. By configuring second lubricant pathway 15 so that lubricant remains about a portion of one or both bearings after pinion 32 ceases rotation, a sufficient amount of lubricant is available when rotation of pinion 32 begins again (e.g., upon startup of the vehicle) so that the available lubricant is distributed to the other portions of the bearings 22 and 24 to sufficiently lubricate the entire bearings during the startup condition.

As illustrated in FIG. 2, first and second lubricant pathways 14 and 15 may be spaced approximately 180 degrees apart from one another on opposing sides of housing 12. Although first and second lubricant pathways 14 and 15 have been described as being spaced approximately 180 degrees apart from one another, it should be understood that first and second pathways 14 and 15 may be spaced approximately 90 degrees apart, 60 degrees apart, or any other angular orientation that enables a portion of lubricant to remain in sump 40 and or otherwise about a portion of one or both of the bearings after rotation of pinion 32 ceases. Furthermore, either or both of first and second lubricant pathways 14 and 15 may be positioned above axis of rotation 52 (FIG. 3).

First lubricant pathway 14 includes a first port 44 located radially outward from head 26 of pinion shaft 20. A second port 46 is located radially outward from tail 28 of pinion shaft 20 at a point disposed between head and tail bearings 22 and 24. Disposed in an axial direction between first and second ports 44 and 46 is a channel 48.

In an exemplary embodiment, during operation of axle assembly 10, rotation of pinion 32 aids in directing lubricant from primary sump 50 into first port 44, through channel 48, and out second port 46 to sump 40. More particularly, the splines of pinion 32 displace lubricant from primary sump 50 toward first port 44, through channel 48, out of second port 46 to sump 40. Sump 40 is located between head and tail bearings 22 and 24 and lubricant is provided to both head and tail bearings 22 and 24 to lubricate each bearing. In another exemplary embodiment, pinion 32 may also displace lubricant found in sump 40 and thereafter direct the displaced lubricant in a direction toward the first lubricant pathway.

In an exemplary embodiment, first port 44 may be provided with a size sufficiently larger than both channel 48 and second port 46. Sizing first port 44 sufficiently larger than both channel 48 and second port 46 may assist in increasing a flow rate of the lubricant through lubricant pathway 14. In some embodiments, first and second lubricant pathways can otherwise be configured so lubricant flows therethrough at a predetermined rate, e.g. the pathways may include a varied cross-sectional area along their length, e.g. includes a tapered section. Lubricant pathways 14 and 15 may also be angled relative to an axis 52 of housing 12 (FIG. 3) to further assist in a quantity or flow rate of lubricant to bearings 22 and 24.

As shown in FIG. 3, first lubricant pathway 14 is disposed on a side 54 of housing 12 disposed between an upper surface 56 and lower surface 58 of housing 12, with lower surface 58 being disposed adjacent a roadside of a vehicle. Second lubricant pathway 15 may be formed on opposing side 55 of housing 12 (FIG. 2) between upper surface 56 and lower surface 58. Lubricant flow toward the bearings through channel 48 may be improved by angling lubricant pathway 14 toward lower surface 58 relative to axis 52. Similarly, by angling lubricant pathway 15 toward lower surface 58 relative to axis 52, lubricant within sump 40 may not require significant agitation by rotation of tail 28 of pinion shaft 20 to force lubricant through second pathway 15 back to primary sump 50. It should be understood as stated above, however, that second lubricant pathway 15 is configured so that lubricant remains about a portion of the bearings after pinion 32 ceases rotation. Lubricant, therefore, is available when rotation of pinion 32 begins again so that bearings 22 and 24 quickly receive sufficient lubrication (e.g., upon startup of the vehicle).

In the exemplary embodiment, rotation of pinion 32 is configured to direct lubricant into first port 44 where gravity will then aid lubricant to flow through channel 48 toward second port 46 to bearings 22 and 24. Regardless, it should be understood that utilizing pinion 32 to direct lubricant to bearings 22 and 24 significantly improves flow of lubricant to bearings 22 and 24 in contrast to a design where, for example, housing 12 is not equipped with a lubricant pathway 14 and rotation of ring gear 36 is used to direct lubricant through housing 12 toward bearings 22 and 24. In this regard, utilizing pinion 32 to direct the lubricant improves the lubrication of bearings 22 and 24 for a plurality of operating conditions, e.g. at very low vehicle speeds (i.e., when rotation of pinion gear is low) and/or at very low temperatures (e.g., at temperatures below freezing, including subzero degree temperature conditions).

Although rotation of pinion 32 is used to direct lubricant into first lubricant pathway 14, the present disclosure should not be limited thereto. In this regard, rotation of ring gear 36 may also be used to direct lubricant toward pinion 32, which then directs lubricant into first lubricant pathway 14. Alternatively, ring gear 36 or pinion 32 may be used to direct lubricant to another sump (not shown), for supplying the lubricant into first lubricant pathway 14. Yet another alternative includes utilizing a separate lubricant source (not shown) that feeds lubricant into first lubricant pathway 14 and/or receives lubricant from return pathway 15. Combinations of the above embodiments may also be used (e.g., ring gear 36 or pinion 32 direct lubricant to the separate lubricant source, which then feeds the first lubricant pathway 14).

As stated above, first port 44 may be sized sufficiently larger than both channel 48 and second port 46 to assist in increasing a flow rate of the lubricant through lubricant pathway 14. First port 44 is also sized sufficiently larger relative to both channel 48 and second port 46 to ensure that lubricant is directed into lubricant pathway 14 during rotation of pinion 32. For example, when the vehicle is driven forward, pinion 32 will rotate counterclockwise to direct lubricant along the lubricant flow path illustrated in FIG. 4.

Although the above disclosure describes lubrication of bearings using a pinion and a ring gear, the present disclosure should not be limited thereto. That is, the use of different types of gears (and bearings) may be utilized with lubricant pathways 14, 15 configurations without limitation. For example, spur gears, helical gears, screw gears, and any other type of gear known to one skilled in the art may utilize the configurations of the lubricant pathways discussed herein.

What is claimed is:

1. An axle assembly for a vehicle, comprising:
   a first gear;
   a second gear joined to a shaft extending along and defining a longitudinal axis, the second gear engaging the first gear;
   a bearing disposed on the shaft distal the second gear; and
   a housing including a coupling configured to receive a driveshaft of the vehicle, the housing being disposed about at least a portion of the shaft, including a first lubricant pathway spaced apart from a second lubricant pathway, the first lubricant pathway routing a lubricant towards the bearing, and the second lubricant pathway routing the lubricant away from the bearing,
   wherein the first and second lubricant pathways are not in a position coplanar with a plane of rotation of the first gear;
   at least the first lubricant pathway includes a first portion that extends radially outward from the longitudinal axis and that directs at least a portion of the lubricant in a direction extending radially outward from the longitudinal axis, a second portion in communication with the first portion that extends in a direction extending along the longitudinal axis and that directs the lubricant in the direction extending along the longitudinal axis, and a third portion in communication with the second portion that extends in a direction radially toward the longitudinal axis and directs the lubricant in the direction radially toward the longitudinal axis; and
   rotation of the second gear pumps the lubricant directly into the first portion of the first lubricant pathway.

2. The axle assembly of claim 1, wherein the first and second lubricant pathways are spaced approximately 180 degrees apart.

3. The axle assembly of claim 1, wherein the second lubricant pathway is configured and positioned so a portion of the lubricant is retained at a bottom portion of the bearing after the second gear has stopped rotating.

4. The axle assembly of claim 1, wherein at least the first lubricant pathway is disposed above the longitudinal axis.

5. The axle assembly of claim 1, wherein at least one of the first and second lubricant pathways is angled relative to the longitudinal axis.

6. The axle assembly of claim 1, wherein the second gear includes a plurality of splines, and the lubricant enters the first lubricant pathway after being displaced by the splines.

7. The axle assembly of claim 1, wherein the first lubricant pathway is configured to direct a predetermined quantity of the lubricant to the bearing.

8. The axle assembly of claim 1, further comprising a second bearing disposed on the shaft that receives lubricant after the lubricant has been displaced by the second gear.

9. The axle assembly of claim 8, wherein the second bearing receives lubricant that passes through the first lubricant pathway.

10. The axle assembly of claim 1, wherein the first gear is a ring gear, and the second gear is a pinion gear.

11. An axle assembly, comprising:
    a housing;
    a pinion gear mounted in said housing, said pinion gear having a shaft defining an axis of rotation and a plurality of splines at a first end thereof;
    at least one bearing disposed about said shaft at a location distal from said first end;
    a ring gear engaged with said splines of said pinion gear, said pinion gear driving rotation of said ring gear in a direction orthogonal to a rotation direction of said pinion gear; and
    a first lubricant flow path formed on an exterior of said housing for directing flow of a lubricant to said bearing, the first lubricant flow path including a first portion that extends in a direction extending radially outward from an axis defined by the shaft and that directs at least a portion of the lubricant in the direction extending radially outward from an axis defined by the shaft, a second portion in communication with the first portion that extends in a direction extending along the axis and that directs the lubricant in the direction extending along the axis, and a third portion in communication with the second portion that extends in a direction radially toward the axis and that directs the lubricant in the direction radially toward the axis,
    wherein said first plurality of splines of said pinion gear pump said lubricant in said rotation direction of said pinion gear directly into said first lubricant flow path to said bearing.

12. The axle assembly of claim 11, wherein said lubricant is pumped in a direction orthogonal to a direction of rotation of said ring gear.

13. The axle assembly of claim 11, wherein said first portion includes a first port located proximate said first end of said pinion, said third portion includes a second port positioned at a location distal said first end of said pinion, and said second portion defines a channel connecting said first and second ports.

14. The axle assembly of claim 13, wherein said first port is located radially outward from said first end, and said second port is located radially outward from said location distal from said first end.

15. The axle assembly of claim 13, wherein rotation of said pinion gear pumps lubricant from a first sump located proximate said first end through said channel to a second sump located proximate said location distal from said first end.

16. The axle assembly of claim 15, further comprising a second lubricant flow path spaced 180 degrees apart from said first lubricant flow path.

17. The axle assembly of claim 16, wherein said second lubricant flow path returns lubricant from said second sump to said first sump.

18. The axle assembly of claim 11, wherein said first lubricant flow path is angled relative said axis.

19. The axle assembly of claim 16, wherein said second lubricant flow path is angled relative to said axis.

* * * * *